(12) United States Patent  (10) Patent No.: US 6,700,216 B1
Vann  (45) Date of Patent: Mar. 2, 2004

(54) MAGNETICALLY LEVITATED WINDMILL

(76) Inventor: Charles S. Vann, 1425 Drake Ave., Burlingame, CA (US) 94010

( * ) Notice: Subject to any disclaimer, the term of this patent is extended or adjusted under 35 U.S.C. 154(b) by 57 days.

(21) Appl. No.: 10/378,422

(22) Filed: Mar. 3, 2003

(51) Int. Cl.[7] ................................................. F03D 9/00
(52) U.S. Cl. .......................................... 290/44; 290/55
(58) Field of Search ............................. 290/44, 55, 43, 290/54

(56) References Cited

U.S. PATENT DOCUMENTS

| 4,289,970 A | * | 9/1981 | Deibert | 290/44 |
| 4,720,640 A | * | 1/1988 | Anderson et al. | 290/43 |
| 5,315,159 A | * | 5/1994 | Gribnau | 290/55 |
| 6,064,123 A | * | 5/2000 | Gislason | 290/55 |
| 6,069,409 A | * | 5/2000 | Fowler et al. | 290/55 |
| 6,468,041 B2 | * | 10/2002 | Ozaki | 417/44.1 |
| 6,589,030 B2 | * | 7/2003 | Ozaki | 417/420 |

FOREIGN PATENT DOCUMENTS

| DE | 3244719 A | * | 6/1984 | F03D/9/00 |
| JP | 2001271737 A | * | 10/2001 | F03D/5/04 |

* cited by examiner

*Primary Examiner*—Joseph Waks

(57) ABSTRACT

Windmill blades are magnetically levitated such that there is no physical contact with the support, avoiding friction. Furthermore, the electromagnetic resistance is varied relative to the rotation speed of the blades. When the blades are at rest, the electromagnetic circuit is inactivated such that the blades have no force to prevent their rotation, friction or electromagnetic, enabling the blades to start rotating at near zero wind speed. As the blades gain rotational momentum, the electromagnetic generators are progressively activated, providing the maximum power generation without stalling the windmill.

6 Claims, 4 Drawing Sheets

MAGNETICALLY LEVITATED WINDMILL

CROSS-REFERENCE TO RELATED APPLICATIONS

This application is related to application Ser. No. 10/165,797, filled Jun. 6, 2002 titled "Multi-axel Windmill".

BACKGROUND—FIELD OF INVENTION

This invention relates to windmills as structures harnessing wind to generate power.

BACKGROUND—DESCRIPTION OF PRIOR ART

Current windmills have rotating blades supported and rotating on some type of bearings. The rotation causes friction that must be overcome before the windmill blades will turn. Furthermore, power-generating windmills have electromagnetic resistance to rotation that also must be overcome to generate power. Too often, wind velocity is not strong enough to overcome these inertial forces, and the blades do not move, and no power is generated.

SUMMARY

In accordance with the present invention, the windmill blades are magnetically levitated such that there is no physical contact with the support, avoiding friction. Furthermore, the electromagnetic resistance is varied relative to the rotation speed of the blades. When the blades are at rest, the electromagnetic circuit is inactivated such that the blades have no force to prevent their rotation, friction or electromagnetic, enabling the blades to start rotating at near zero wind speed. As the blades gain rotational momentum, the electromagnetic generators are progressively activated, providing the maximum power generation without stalling the windmill.

OBJECTS AND ADVANTAGES

Accordingly, advantages of a magnetically levitated windmill over a conventional windmill are:

Produces power at very low wind velocity, solving the major problem with wind power.

Eliminates power loss to friction

Generates maximum power by varying electromagnetic resistance to wind velocity

Reduces maintenance since frictionless parts last longer.

DRAWING FIGURES

Reference is now made to the embodiment of this invention illustrated in FIGS. 1–6 when like numerals are used to designate like parts throughout.

Figure 1:
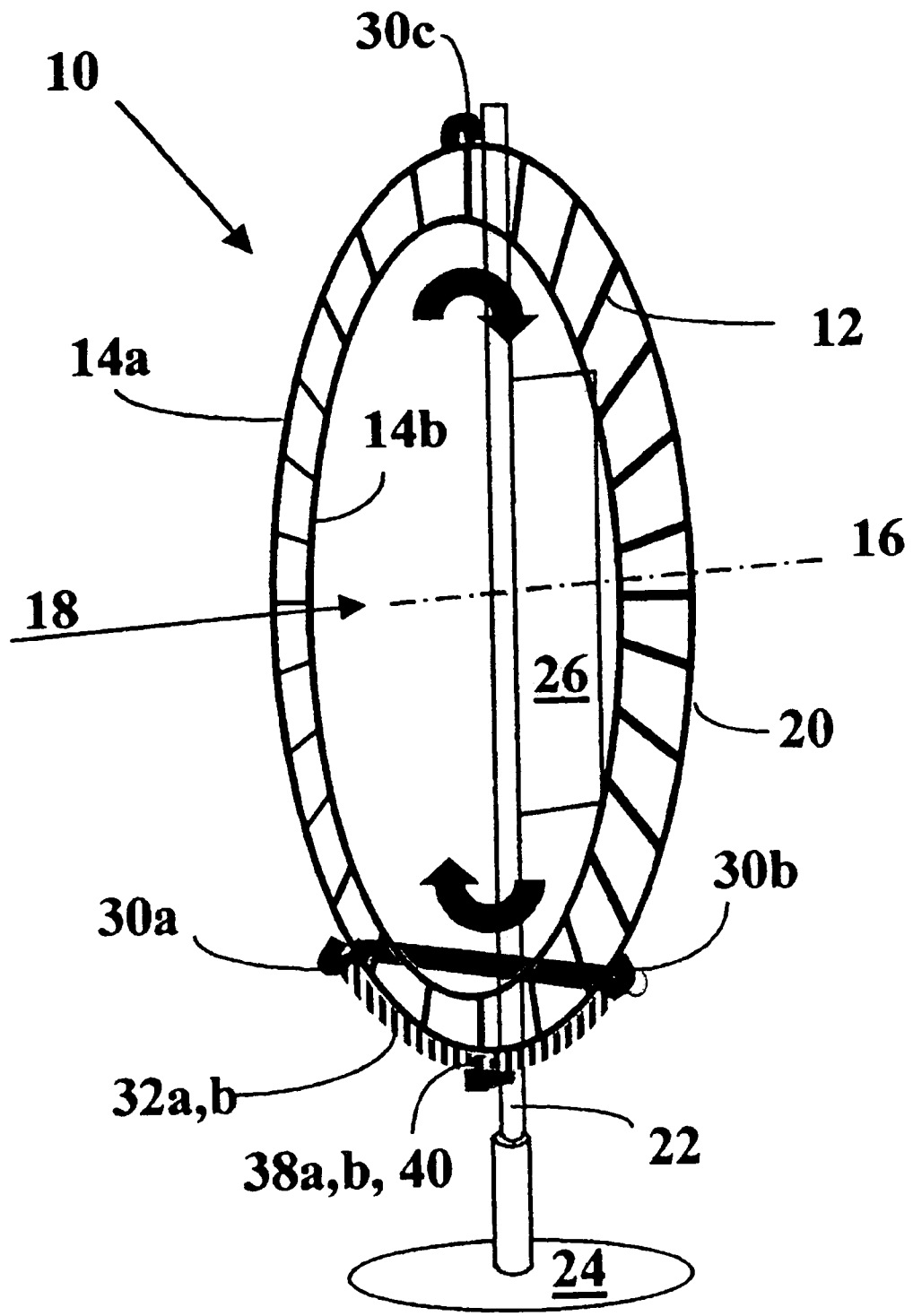
FIG. 1 is an isometric view of the embodiment.

REFERENCE NUMERALS IN DRAWING 10 embodiment
12 blades
14a,b outer and inner rim
16 axis of rotation
18 wind
20 power magnets
22 support
24 base
26 tail
30a–c levitating magnets
32a,b electrical wire
34 magnetic field lines
36a,b power load
38a,b switch
40 rotation sensor

DESCRIPTION

FIG. 1 shows a magnetically levitated windmill 10 consisting of a plurality of blades 12 fixed to outer rim 14a on one end and fixed to inner rim 14b on the other end. (If blades are adequately supported by rim 14a, rim 14b may not be necessary.) A plurality of power magnets 20 arranged into a circle form the outer rim 14a. Power magnets 20 may be held together by any of several means such as welding, screws, glue, etc. Support 22 holds levitating magnets 30a–c such that the repelling force between magnets 20,30 constrains outer rim 14a to rotate about a fixed point on axis of rotation 16. Support 22 is coupled with base 24 such that it can rotate about its axis while base 24 is rigidly fixed to the ground, buildings, or other stable structures. Wind tail 26 is attached to support 22 such that wind 18 forces support 22 to rotate in base 24 until aligned in the direction of wind 18. Wires 32a,b are wound around support 22 such that the rotation of the power magnets 20 forming rim 14a induces current in wires 32a,b when switches 38a,b are closed. Rotation sensor 40 attached to support 22 opens and closes switches 38a,b depending on wind velocity.

Figure 2:
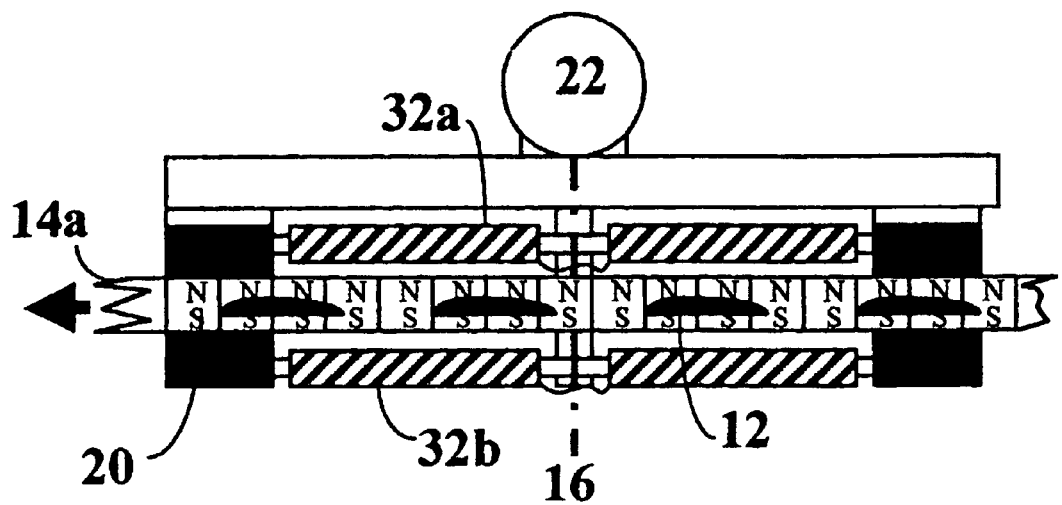
FIG. 2 is a cross section view of a blade as viewed from the axis of rotation.

FIG. 2 shows a cross section of blade 12 as viewed from axis of rotation 16. Support 22 holds levitating magnets 30a,b and wire 32a,b such that rim 14a rotates freely about axis of rotation 16 but is otherwise constrained. Power magnets 20 are oriented in the same direction.

Figure 3:
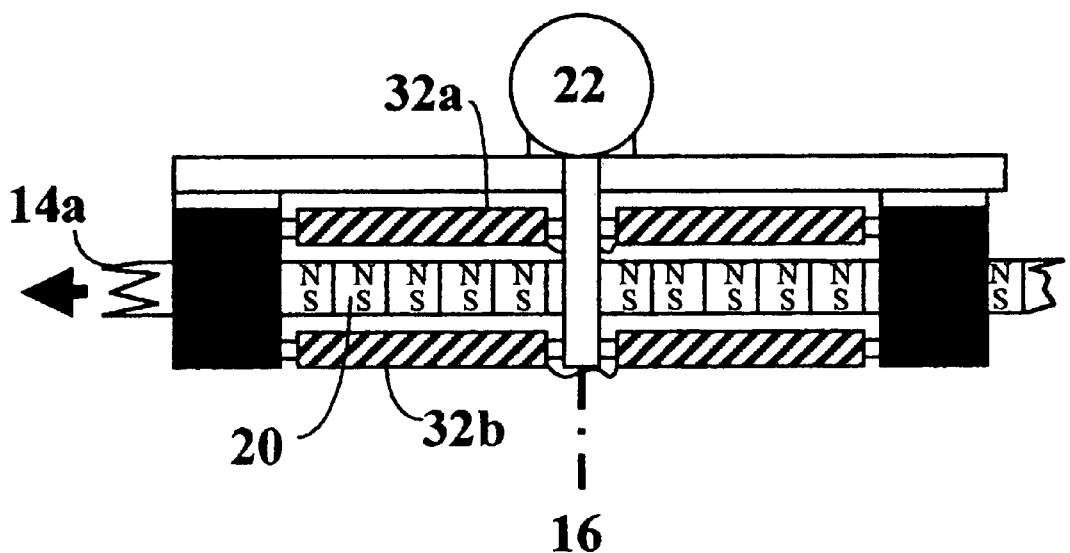
FIG. 3 is a view of the magnets as viewed towards the axis of rotation.

FIG. 3 shows a view of rim 14a as viewed towards the axis of rotation.

Figure 4:
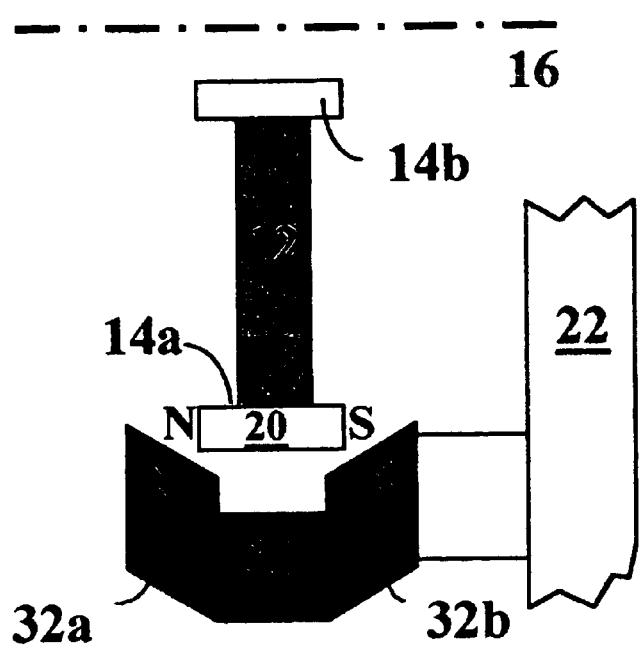
FIG. 4 is a cross section view of a blade and a levitating magnet.

FIG. 4 shows a cross section view of blade 12 and a levitating magnet 30 as viewed perpendicular to axis of rotation 16. Power magnets 20 and levitating magnets 30 are oriented to repel each other such that they never physically touch while constraining rim 14a to rotation about a fixed point on axis of rotation 16.

Figure 5:
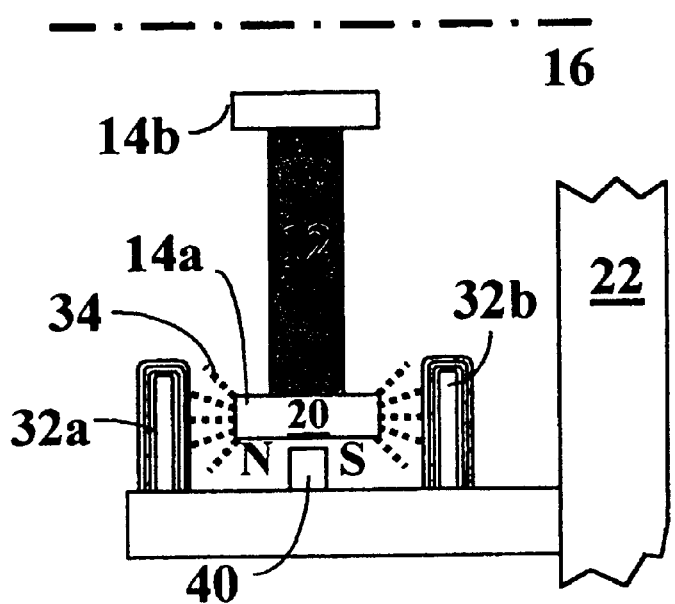
FIG. 5 is a cross section view of a blade and wire coils.

FIG. 5 shows a cross section view of blade 12, support 22, and wires 32a,b as viewed perpendicular to axis of rotation 16. Power magnets 20 are positioned close enough to wires 32a,b such that their magnetic field lines 34 cut through wires 32a,b during rotation of rim 14a, inducing current.

Figure 6:
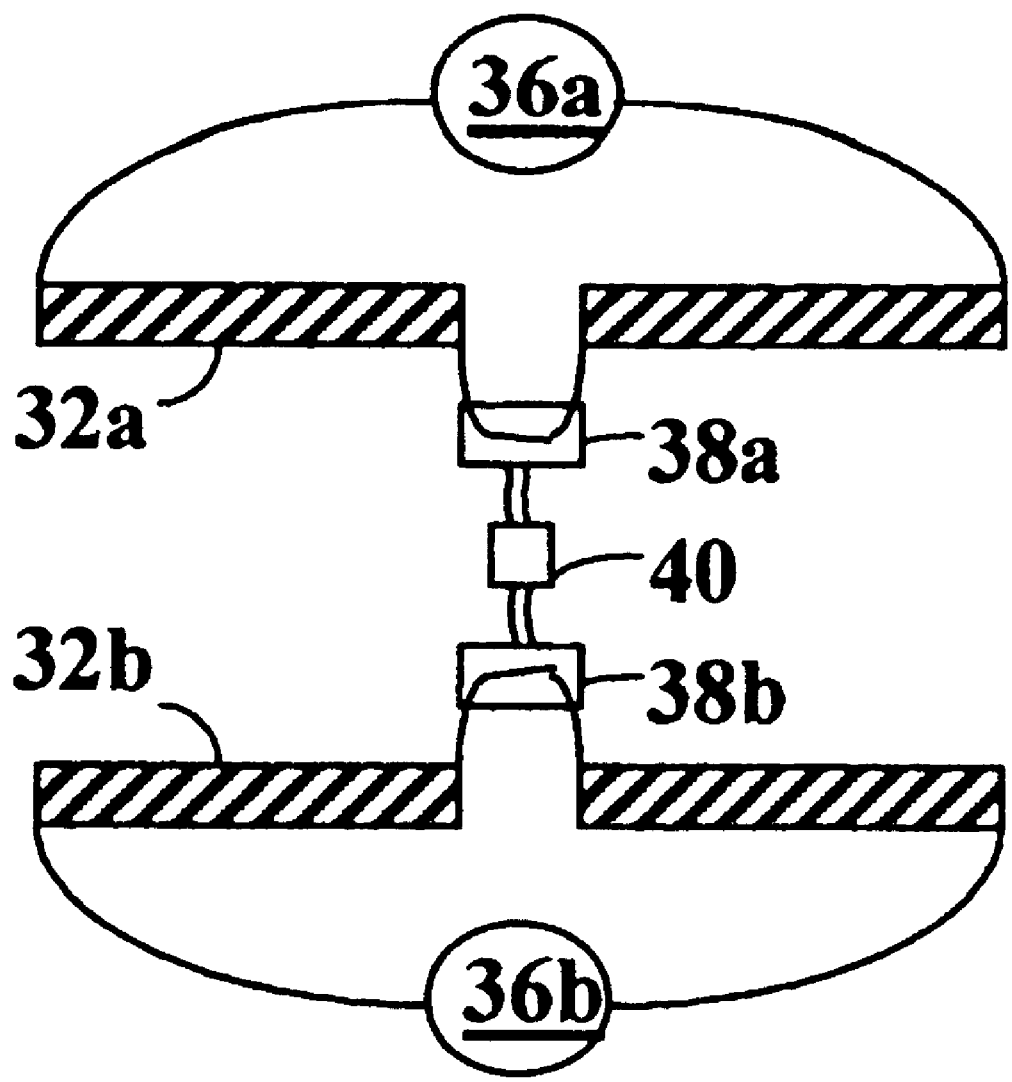
FIG. 6 is an electrical schematic of the wire coils and rotation sensor.

FIG. 6 shows the electrical connection of wire 32a for delivering current to a power load 36a when switch 38a is closed. When switch 38a is open, no current is delivered from wire 32a. Likewise, FIG. 6 shows the electrical connection of wire 32b for delivering current to power load 36b when switch 38b is closed. When switch 38b is open, no current is delivered from wire 32b. Rotation sensor 40 is positioned to detect rotation of rim 14a and connected to switches 38a,b such that switches 38a,b are open at low rotation speeds, and one or both switches 38a,b are closed at high rotation speeds.

OPERATION

If wind-tail 26 is not parallel to the wind direction, wind 18 applies force on tail 26 causing support 22 to rotate in fixed base 24 until tail 26 is parallel to wind 18, forcing blades 12 perpendicular to wind 18. Wind 18 creates lift on blades 12 such that each blade 12 forces rim 14 to rotate about axis of rotation 16. Levitating magnets 30*a–c* exert force on power magnets 20 from six directions such that rim 14*a* is constrained in all motion but free rotation about axis 16. The rotation of rim 14*a* causes the magnetic field lines 34 of magnets 20 to cut through wires 32*a,b*. If wires 32*a,b* are closed circuits, the magnetic field lines 34 induce a current in wires 32*a,b* and creates an electromagnetic force resisting the rotation of rim 14*a*. If wires 32*a,b* are open circuits, the magnetic field lines 34 do not induce a current in wires 32*a,b*, and no electromagnetic force is generated to resist the rotation of rim 14*a*.

When rotation sensor 40 senses low rotational speed of rim 14*a*, it will open switches 36*a,b*, eliminating electromagnetic resistance. Thus, the windmill will have no forces to prevent it from rotating. As wind 18 exerts lift on blades 12 and rim 14*a* starts to rotate, sensor 40 will sense its rotation speed. At a predetermined rotation speed, sensor 40 will close one or both switches 38, allowing current to flow to power loads 34*a,b*. If rotation of rim 14*a* drops below the predetermined rotation speed, sensor 40 will open one or both switches such that rim 14*a* will again gain rotational speed. This procedure of opening and closing switches is repeated indefinitely to maximize power output.

CONCLUSIONS, RAMIFICATIONS, AND SCOPE

A windmill with magnetically levitated blades solves the major problem with windmills, generating power at low wind velocity. Since few parts of the world have consistently, high-velocity wind, windmills have not been a compelling power source. However, with the average wind velocity for generating power significantly lowered by this invention, wind power becomes a viable option for large-scale power generation. Eliminating friction further improves viability since maintenance is greatly reduced.

I claim:

1. A windmill, comprising:

a rigid structural support;

two or more levitating magnets attached to said support;

a circular arrangement of power magnets levitated by said levitating magnets;

plurality of blades attached to said circular arrangement of power magnets;

wherein wind causes said blades to rotate about an axis without physical contact with the support.

2. Windmill of claim 1 further including a fixed base in which said support rotates.

3. Windmill of claim 1 further including a wind tail attached to said support wherein wind forces cause said support to rotate in said base to position said blades in the direction of the wind.

4. Windmill of claim 1 further including one or more wire circuits attached to said support such that the magnetic field lines from said power magnets will generate current when said blades rotate.

5. Wire circuit of claim 4 further including one or more switches to open or close said wire circuits.

6. Wire circuit of claim 4 further including a sensor to measure rotation speed of said blades.

* * * * *